United States Patent [19]

Chesla et al.

[11] 4,135,472

[45] Jan. 23, 1979

[54] MISHANDLING DETECTOR FOR PACKAGES

[76] Inventors: Frank J. Chesla, Box 22 US Navcommsta, Keflavik, Iceland; Gerald K. Wild, 14 Farley St., Box 232, Exmouth 6707, Australia

[21] Appl. No.: 891,887

[22] Filed: Mar. 30, 1978

[51] Int. Cl.$^2$ ............................................. G01P 13/02
[52] U.S. Cl. ................................ 116/124 R; 116/203
[58] Field of Search ....... 116/114 R, 114 AH, 124 R; 73/11, 12, 492, 503; 222/457.5, 454

[56] References Cited

U.S. PATENT DOCUMENTS

| | | | |
|---|---|---|---|
| 1,865,023 | 6/1932 | Leavy | 222/454 |
| 2,674,221 | 4/1954 | Tinsley | 116/114 AH |
| 3,023,935 | 3/1962 | Wagner | 222/454 |
| 3,207,122 | 9/1965 | Salembier | 116/114 AH |
| 3,688,734 | 9/1972 | Davis | 116/114 AH |
| 3,926,144 | 12/1975 | Lander | 116/124 R |

*Primary Examiner*—S. Clement Swisher
*Assistant Examiner*—Denis E. Corr
*Attorney, Agent, or Firm*—R. Sciascia; R. Beers; S. Sheinbein

[57] ABSTRACT

A reusable tilt or inversion indicator comprising a clear, plastic vial having two chambers and a funnel. The lower chamber of the vial is filled with a granular material such as sand. The funnel is inverted and retained between the two chambers of the vial. When an article to which the indicator is attached is tilted or inverted, the material will spill through the opening in the funnel and become trapped between the funnel and the walls of the upper chamber of the vial to provide a permanent indication of the tilt of the article.

4 Claims, 6 Drawing Figures

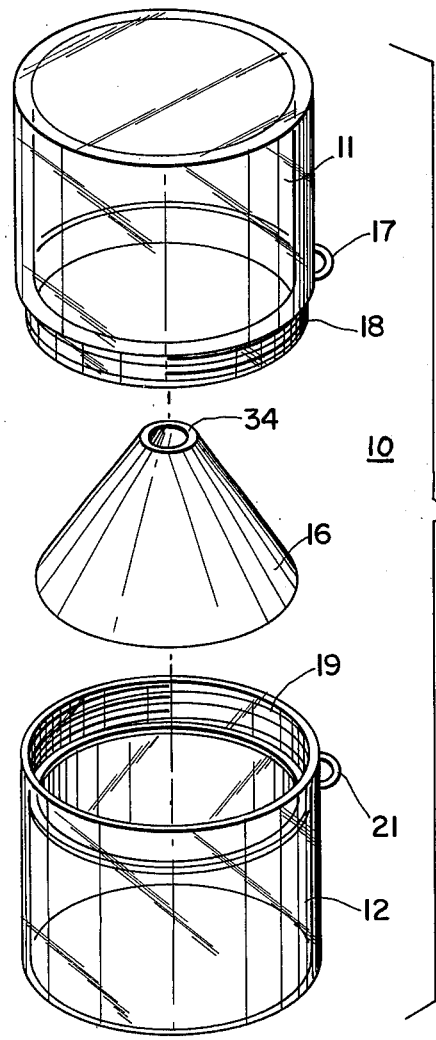
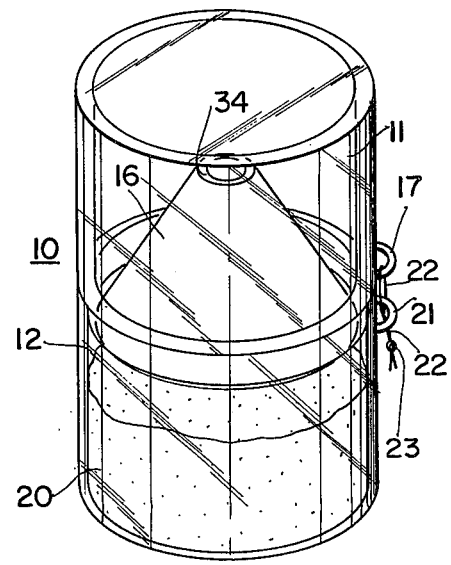
FIG. 2
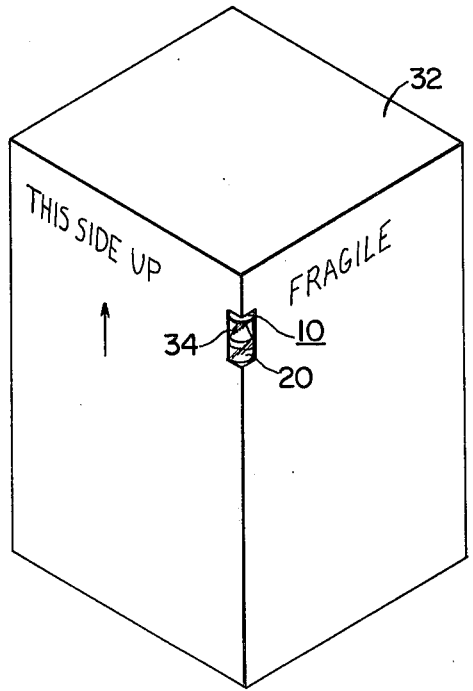
FIG. 3

MISHANDLING DETECTOR FOR PACKAGES

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention relates to visual indicators and in particular to a mishandling detector for use upon packages that require careful treatment in shipping.

Highly sensitive and critical materials, often having large monetary values, are shipped in containers marked for careful treatment. However, during transit these containers are often stored on their sides or even upside down seriously damaging the enclosed materials. Furthermore, loading and unloading of such containers may take place either in a conscious or unconscious disregard of the markings in a manner which likewise damages the materials and renders them defective. The cost of these mishandled materials is usually absorbed by the requisitioner who while he is not at fault does not know with whom the fault lies. Thus, a mishandling detector that permanently indicates improper treatment of packages would provide the requisitioner of such packages with knowledge that he is receiving mishandled material that may be seriously damaged and permit the cost of such material to be absorbed by the carrier at fault.

Existing visual indicators for package tilt or inversion do not adequately satisfy the need for permanent detection of mishandling. Various types of tilt or inversions indicators have been conceived, such as those taught by U.S. Pat. Nos. 3,926,144, 2,674,221, 3,207,122 and 3,688,734, each having a means for preserving its indication of improper package treatment. While these devices have preserved their indications to some extent, they have not proven entirely satisfactory in permanently indicating mishandling.

SUMMARY OF THE INVENTION

Accordingly, the present invention provides an inexpensive, reusable tilt or inversion indicator. The tilt or inversion indicator comprises a transparent vial with an upper and a lower chamber and a funnel. The lower chamber of the vial is filled with a granular material, such as sand, and the funnel is inverted and held between the two chambers of the vial. In the event an article to which the indicator is attached is tilted on its side or inverted, the granular material will spill through the opening in the funnel and become trapped between the funnel and the wall of the upper chamber of the vial. The granular material will remain trapped, providing a record of any mishandling, even if the article is subsequently uprighted.

OBJECTS OF THE INVENTION

It is therefore an object of the present invention to provide a reliable tilt or inversion indicator.

A further object of the present invention is to provide a tilt or inversion indicator to record the handling history of an article in shipment.

Another object of the present invention is to provide a tilt or inversion indicator which can be easily and inexpensively manufactured.

Still another object of the present invention is to provide a tilt or inversion indicator which can be easily attached to an article.

Yet another object of the present invention is to provide a reusable visual detection device for mounting on packages requiring careful treatment which affords permanent means for indicating mishandling.

BRIEF DESCRIPTION OF THE DRAWINGS

Other objects and many of the attendant advantages of the present invention will be readily apparent as the invention becomes better understood by reference to the following detailed description with the appended claims, when considered in conjunction with the accompanying drawings, wherein:

FIG. 1 is a elevational view of the elements comprising the mishandling indicator prior to assembly and mounting according to the present invention;

FIG. 2 is a front view of the mishandling indicator fully assembled;

FIG. 3 is a perspective view of a possible installation scheme for the mishandling indicator.

DESCRIPTION OF THE PREFERRED EMBODIMENT

Figure 4A:
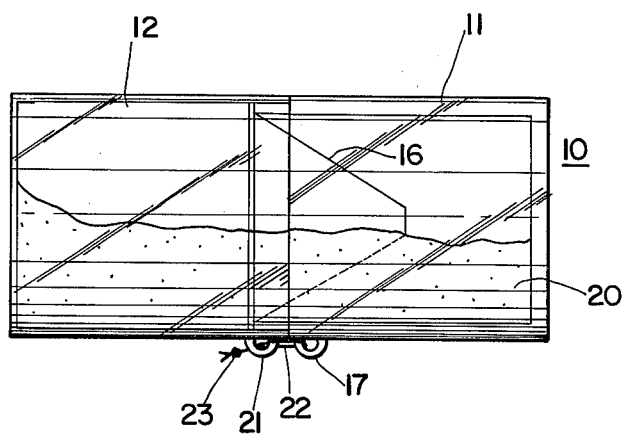
FIGS. 4(a) – 4(c) are sectional representatives of the operation of the mishandling detector upon package mishandling.

Referring now to the drawings, wherein like reference characters designate like or corresponding parts throughout the several views, FIG. 1 shows a vial 10 which is cylindrical in shape and enclosed at both ends. Vial 10 comprises two separable sections, an upper chamber 11 and a lower chamber 12. Upper chamber 11 has an eyelet 17 molded to its exterior near the bottom thereof and has male threads 18 located at the bottom thereof. Lower changer 12 is complementary thereto, having an eyelet 19 molded to its exterior near its top thereof and frmale threads 21 located in its interior near the top thereof. Vial 10 is made of a translucent or transparent material, typically of a polymeric plastic substance such as moulded polypropylene or polyacrilate and can be of any convenient length and of any convenient diameter. Depending on the article to which it will be attached, typical dimensions for vial 10 will be a length of from 5 to 10 inches and a diameter of from 2 to 4 inches.

An inverted funnel 16 comprises a conically shaped piece of metal or resilient plastic, open at both ends, having sides which form an acute angle of between 10° and 80° with a vertical line through the center of the openings in the respective ends of the funnel. The larger of the openings is of approximately the same diameter as the diameter of vial 10. The diameter of the smaller opening 34 of the funnel 16 is determined by the height of the funnel, and the degree of the acute angle of the sides. As will become apparent hereinafter, the only constraint on the height of funnel 16 is that there be a sufficient space between the tip of the funnel, i.e., the smaller opening 34, and the end of upper chamber 11 to permit a granular material (not shown in FIG. 1) to pour through the smaller opening 34 and into the chamber 11.

Referring now to FIG. 2, a granular material 20, such as sand, is placed in lower chamber 12 of vial 10 to fill it to a substantial degree. Funnel 16 is snugly fitted within vial 10, and may be mounted on an annular ledge (not shown) located just beneath female threads 19 of lower chamber 12. Upper chamber 11 is then placed over funnel 16 and coupled to lower chamber 12 by completely treading male threads 18 of upper chamber 11 into female threads 19 of lower chamber 12. When so coupled, eyelet 17 of upper chamber 11 is vertically aligned above eyelet 21 of lower chamber 12. A wire clip 22 is then passed through eyelets 17 and 21 and sealed together with a seal 23 to form a locking mechanism which prevents vial 10 from being separated into its respective chambers without breaking the seal.

A possible method of attaching tilt or inversion indicator 10 to an article is depicted in FIG. 3 which shows a packing carton 32 with a notch 34 cut into it. Notch 34 is of the same width as the diameter vial 10. Inversion indicator 30 is placed in notch 34 and taped to the sides of carton 32.

Figure 4B:
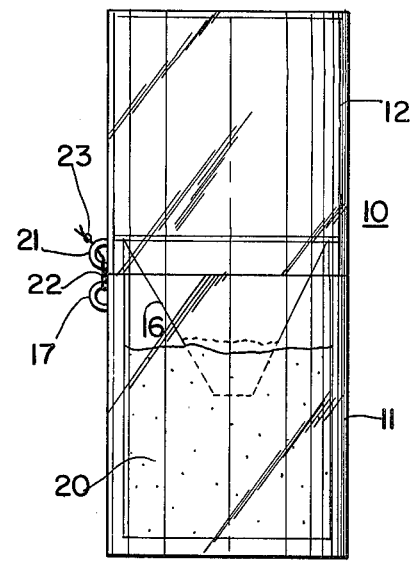
Figure 4C:
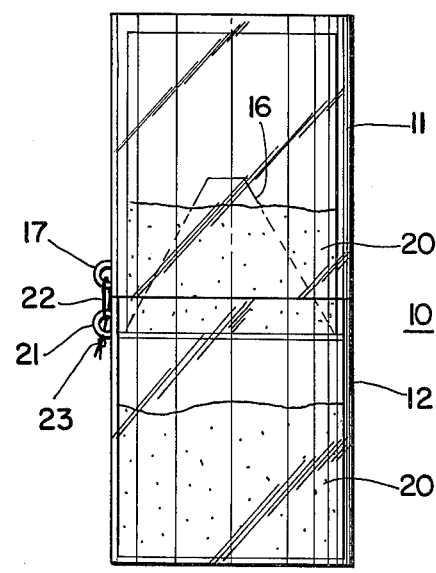

In operation, if carton 32 to which tilt or inversion indicator 10 is attached is tilted on its sides as in FIG. 4(a) or inverted as in FIG. 4(b), granular material 20 will spill through the smaller opening 34 of funnel 16 into upper chamber 11 of vial 10. The granular material 20 which spill through the opening of funnel 16 is trapped between funnel 16 and the wall of upper chamber 11, even if the article to which tilt or inversion indicator 10 is attached is later uprighted as in FIG. 4(c). And, since the two chambers of vial 10 cannot be separated without breaking seal 23, a record of improper handling of carton 32 can be preserved. When this article reaches its destination, vial 10 can be removed, the two chambers separated and the portion of granular material 20 trapped in upper chamber 11 can be returned to lower chamber 11. To reuse tilt or inversion indicator 10, upper chamber 11 and funnel 16 are coupled to lower chamber 12 by means of a new wire and seal.

Therefore, it is apparent that the disclosed method for indicating whether an article is shipment has been tilted on its side or inverted provides an accurate, dependable record of mishandling. In addition, the disclosed tilt or inversion indicator can be easily and inexpensively manufactured and is reusable.

Obviously, other embodiments and modifications of the present invention will readily come to those of ordinary skill in the art having the benefit of the teachings presented in the foregoing description and the drawings. It is, therefore, to be understood that this invention is not to be limited thereto and that said modifications and embodiments are intended to be included within the scope of the appended claims.

What is claimed and desired to be secured by Letters Patent of the United States is:

1. Apparatus for indicating whether an article to which it is attached has been tilted on its side or inverted comprising:
    a vial having an upper and lower chamber;
    a granular material contained in said lower chamber;
    funnel means located within said vial and coupled between said upper chamber and said lower chamber the narrower portion of said funnel substantially projecting into said upper chamber, whereby the tilting or the inversion of said article to which said apparatus is attached will cause said granular material to pour through said funnel and become trapped between said funnel and the walls of upper chamber; and
    fastener means coupled to said funnel whereby when said upper chamber and said lower chamber of said vial and said funnel are coupled together, said upper chamber may not be separated from said lower chamber without permanently damaging said fastener means.

2. Apparatus for indicating whether an article to which it is attached has been tilted on its side or inverted comprising:
    a vial having an upper and a lower chamber;
    a granular material contained in said lower chamber;
    funnel means located within said vial and coupled between said upper chamber and said lower chamber whereby the tilting or the inversion of said article to which said apparatus is attached will cause said granular material to pour through said funnel and become trapped between said funnel and the walls of upper chamber;
    fastener means coupled to said funnel whereby when said upper chamber and said lower chamber of said vial and said funnel are coupled together, said upper chamber may not be separated from said lower chamber without damaging said fastener means;
    a first eyelet molded onto the lower part of the exterior of said upper chamber, a second eyelet molded onto the upper part of the exterior of said lower chamber, male threads on the lower part of upper chamber, female threads in the upper part of said lower chamber,
    whereby when said upper chamber is completely threaded into said lower chamber, said first eyelet is in vertical alignment with said second eyelet,
    wherein said fastener means comprises a wire passed through said first and second eyelets after they are vertically aligned, said wire thereupon being sealed.

3. Apparatus for indicating tilt or inversion as described in claim 2 wherein said vial is transparent and comprises polymeric plastic.

4. Apparatus for mounting upon a package and permanently indicating the mishandling thereof, comprising:
    an indicating medium of an inert granular quality;
    first transparent means for storing said indicating medium, said first transparent means comprises a base chamber of a transparent material having female threads on its interior near the top thereof;
    second transparent means which mates and interlocks with said first transparent means for providing a captivating area into which said indicating medium flows upon mishandling of the package, said second transparent means comprises a top chamber conforming in material and shape to said base chamber, having male threads near the bottom thereof to mate with said female threads to completely close said apparatus;
    a conical divider of resilient material snugly mounted between said base chamber and top chamber, the larger opening of said divider mounted near said female and male threads, the smaller opening of said divider located near the top of said chamber;
    whereby when said apparatus is tilted, some of said indicating medium flows out from said base chamber, said larger opening of said divider, and said smaller opening of said divider into said top chamber to be retained therein;
    means for permanently sealing said top chamber to said base chamber, said sealing means comprising:
    a first eyelet molded to the exterior of
    said top chamber near the threads thereof;

a second eyelet molded to the exterior of said lower chamber near the threads thereof;
a second eyelet in vertical alignment with said first eyelet when said top chamber is completely threaded into the base chamber;

a wire passed through said first and second eyelets; and
a seal to permanently seal said wire after threading thereof through said first and second eyelets.

* * * * *